United States Patent
Albuquerque E Póvoas

(10) Patent No.: US 11,673,588 B2
(45) Date of Patent: Jun. 13, 2023

(54) EQUIPMENT AND METHOD FOR SHARING RAILWAY CARS LOWER CHASSIS WITH UPPER CHASSIS OR CABINS

(71) Applicant: António José Albuquerque E Póvoas, Lisbon (PT)

(72) Inventor: António José Albuquerque E Póvoas, Lisbon (PT)

(*) Notice: Subject to any disclaimer, the term of this patent is extended or adjusted under 35 U.S.C. 154(b) by 356 days.

(21) Appl. No.: 16/906,495

(22) Filed: Jun. 19, 2020

(65) Prior Publication Data
US 2020/0317232 A1  Oct. 8, 2020

Related U.S. Application Data

(63) Continuation of application No. PCT/IB2018/060380, filed on Dec. 19, 2018.

(30) Foreign Application Priority Data

Dec. 19, 2017 (PT) .......................................... 110462

(51) Int. Cl.
  B61D 47/00 (2006.01)
  B60P 1/64 (2006.01)
  (Continued)

(52) U.S. Cl.
  CPC .......... B61D 47/00 (2013.01); B60P 1/6418 (2013.01); B61B 1/00 (2013.01); B61D 1/00 (2013.01);
  (Continued)

(58) Field of Classification Search
  CPC ... B61D 1/00; B61D 3/00; B61D 3/08; B61D 3/16; B61D 47/00; B60P 1/64;
  (Continued)

(56) References Cited

U.S. PATENT DOCUMENTS

4,728,241 A * 3/1988 Edelhoff .............. B65G 63/004
  414/344
6,619,904 B1 * 9/2003 Barry ..................... B66C 17/20
  414/337

FOREIGN PATENT DOCUMENTS

DE  0831002 A1 * 3/1998 .......... B65G 63/025
DE  19804491 A1 * 8/1999 ............. B61D 47/00
  (Continued)

*Primary Examiner* — Zachary L Kuhfuss
*Assistant Examiner* — Cheng Lin

(57) ABSTRACT

The invention described refers to an equipment and corresponding method that enables side sliding load transfer between one vehicle/structure acting as loader, and another vehicle/structure acting as receptor. Both loaders and receptors can be vehicles or piers using a side sliding loading system that includes lifting and lateral displacement equipment. The great innovation of this system is the appearing of carriages consisting of 2 chassis, one inferior and one superior, both mobile and independent, that are coupled to form a single carriage. One of the equipment developed, automatically auto-load/unload standard containers to/from railway wagons and fixed platforms. This equipment can be loaded directly by the pier crane and move autonomously to the loading areas of railway wagons, trucks or buffer areas, where the containers are organized on leaving the port. When groups of these vehicles lined up parallel to the railway track, loaded on one side and empty on the other, they can load and unload the train quickly and simultaneously.

7 Claims, 16 Drawing Sheets

(51) Int. Cl.
    *B61B 1/00*           (2006.01)
    *B61D 1/00*           (2006.01)
    *B61D 3/00*           (2006.01)
    *B61D 15/00*          (2006.01)
    *B63B 27/00*          (2006.01)

(52) U.S. Cl.
    CPC ............... *B61D 3/00* (2013.01); *B61D 15/00* (2013.01); *B63B 27/00* (2013.01)

(58) Field of Classification Search
    CPC ...... B60P 1/6418; B60P 1/6436; B63B 27/00; B61B 1/00; B65G 63/004; B65G 63/025
    See application file for complete search history.

(56) References Cited

FOREIGN PATENT DOCUMENTS

| | | | | |
|---|---|---|---|---|
| DE | 102006014214 A1 | * | 9/2007 | ............. B61D 47/00 |
| WO | WO-2006119955 A1 | * | 11/2006 | ........... B65G 63/025 |

\* cited by examiner

EQUIPMENT AND METHOD FOR SHARING RAILWAY CARS LOWER CHASSIS WITH UPPER CHASSIS OR CABINS

SCOPE OF THE INVENTION

The invention described in this document falls within the domain of railway transportation and ports logistics, more specifically bringing a different way of loading freight and passenger cabins over railway lower chassis.

FRAMEWORK OF THE INVENTION

Railway is the land transportation way with more capacity to transport freight and passengers. During the last years, the most developed countries have strongly invested in High Speed Trains for passengers that aim to interconnect the large cities inside one country but also to provide fast connections with neighbor countries, namely in Europe.

High Speed Trains require specific rules for the track design, alignment and safety, hardly achieved by the old existing tracks, forcing to build new infrastructures, extremely expensive and with time-consuming construction. Adding to this, it is impossible for the old trains to coexist with new trains on the same tracks with different traveling speeds and control systems, namely in the case of obsolete freight trains.

The generalized increase of international traffic of containers, is overloading the existing railways tracks, what requires more efficient logistic systems at the ports and higher railway transportation capacity, by increasing the frequency and speed, what cannot be done in some old tracks.

Building new tracks for High Speed Trains (HST) and new tracks for freight trains takes too much time and is economically unsustainable. Therefore, it is logic to find solutions for using the same tracks for both High Speed Trains and freight trains.

One solution for using the same tracks for both HST and freight is now brought by the solution referred in this invention, by using new fast and "intelligent" self-transformable carriages that can carry freight and/or passengers according to traffic demand, capable of quickly changing payload and travel at high speeds using the same track.

Freight transportation suffered huge increasing in the last years and ports is being overloaded, so it is essential to accelerate the containers rotation in ports. The equipment referred in this invention can play an important role in seeking solutions, since it decreases the staying time of containers in ports increasing number of daily freight trains.

BACKGROUND OF THE INVENTION

There are several patent documents referring systems to use in the railway transportation, namely self-propelled platforms, methods and equipment for lateral loading of railway cars.

The document DE4114392 refers to an equipment and a method for lateral loading of freight wagons.

Or document GB1166109 that refers one system of moving, storing and transferring containers.

The document GB2305645 can also be considered as the documents refers to one system for transferring carriages of people or goods between different transporting vehicles type.

The document CH629446A5 refers to a system to slid adapted containers that a special configuration to fit in a sling equipment.

Or document EP 0583633 that refers a moving platform that shifts cars from a fixed platform to railway wagons.

However, no documents were found which refer to methods identical to the method for which protection is sought, being the mentioned behind those who present technologies that can be used for the prosecution of the method referred to in the present invention.

The major difference between the systems previously referred and the systems of the method for which protection is sought, is the fact that none of them considers integrated systems with self-transformable vehicles made of two chassis, both capable of traveling independently and get together assembling themselves into one single carriage.

The upper chassis have their own capacity to circulate and they can be either motorized and autonomous or towed by a driving equipment.

The characteristics of this new type of carriages as well as those required for the infrastructures allow the use and development of the method of the present invention.

Moreover, none of the indicated systems allows to lateral shift the standard containers to the existing trains, autonomously and without adding other platforms on board, as the "Automotrice Grande Vitesse Side Sliding Loading system (AGV-SSL)" does.

ADVANTAGES OF THE INVENTION

To optimize railway transportation, it is indispensable to overcome some of the existing conditioning factors such as:
Traffic overload of the existing infrastructures;
Growing increase of freight transportation by railways;
Long time required for the construction of new infrastructures;
Existence of different gauges in neighbor countries;
High cost of the new infrastructures sometimes underutilized;
Inefficiency of the extraction of containers from ports by trains;
Long immobilization time of railway wagons at ports and logistic terminals for loading them with containers;
Need of increasing the parking areas for stowing containers in sea ports that do not have free space to grow.

The method described in this invention brings an integrated solution for most of those problems by introducing a simple way for sharing the use of the rolling lower chassis, allowing their use by different type of upper chassis, that can easily slide over them, quickly changing the payload of the wagons either when carrying passengers or freight.

This optimization is achieved by changing the train typology, bringing a new way of loading cabins/freight over trains—the Side Sliding Loading (SSL) system—and also introducing new and simple infrastructures at railway platforms for loading/unloading the trains at ports and other type of railway stations.

In the solution referred in the present invention, both the upper chassis and the lower chassis can move and circulate independently, what has brought several new fields for railways scope of use.

The new self-transformable carriages can use both the existing infrastructures and the new ones. To use this new chassis sharing method, it will only be necessary to make simple adaptations of the existing railway stations and logistic terminals.

This solution brings a greater flexibility on the use of the carriages as it allows that they are configured according to the existing demand, on real time, making the railway service more versatile and adaptable to the utilization request of both passengers and freight. This way, the railway networks can keep the regular schedules for passengers, increase the number of passenger trains whenever necessary, and use all the remaining free slots of the track schedule for freight transportation.

The new equipment can optimize the logistic efficiency of the ports, reducing the necessary equipment and men to move a container, pre-organizing the containers for the next train and loading/unloading the train at once allowing a greater number of daily trains.

This new system for loading/unloading trains allows an optimized use of both trains and railway tracks by providing fast transportation of passengers and freight according to demand, on real time. To use this method within the existing freight trains and railway tracks, it is presented a completely new equipment that have the ability to move autonomously, position themselves parallel to the railway wagon, self-level and fit in the wagon to proceed with the sliding of the containers from above the wagon onto themselves or in the reverse way from above the wagon onto themselves.

When these vehicles are associated together parallel to the train assembling a mobile pier, they can perform the loading/unloading of all wagons simultaneously. Another use of this equipment is the possibility of feeding buffer structures with same height where containers can be stored and organized for next shipment or train loading.

BRIEF DESCRIPTION OF THE DRAWINGS

These and other features can be easily understood from the accompanying drawings, which should be considered as mere examples and not in any way restrictive of the scope of the invention. In these drawings and just for illustrative purposes, the dimensions of some elements may be exaggerated and not drawn to scale. Absolute and relative dimensions may not correspond to the real ratios for carrying out the invention.

On FIG. 1 it is possible to observe the elements of a self-transformable carriage (1) and a possible direction of sliding between the lower chassis (2) and the mobile upper chassis (3).

Figure 1:
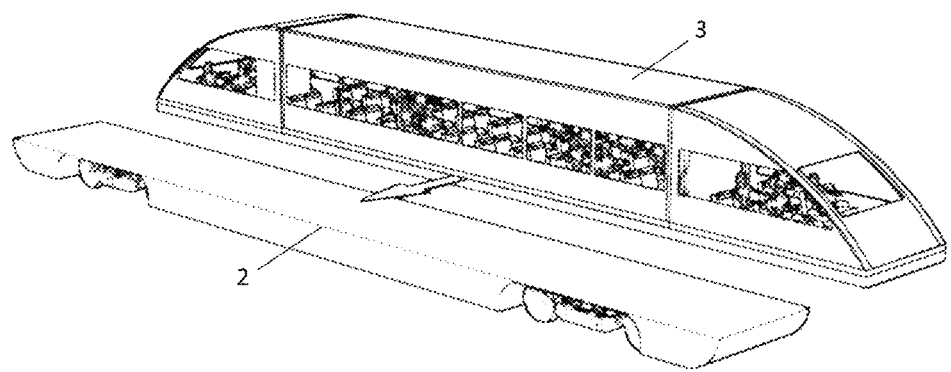
Figure 2:
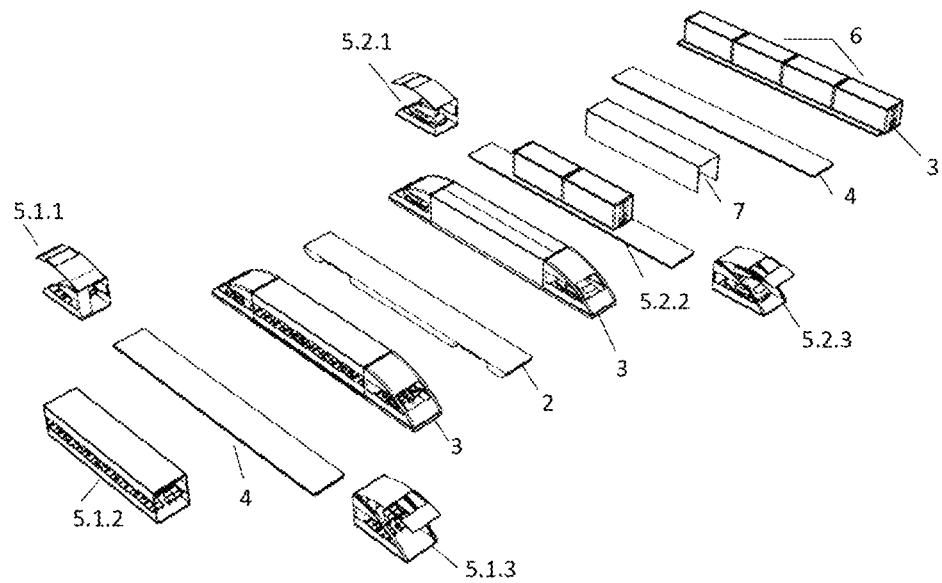
FIG. 2 presents the lower chassis (2) and several combinations that represent different ways of assembling for the mobile upper chassis (3). The mobile upper chassis (3) can be platforms (4) that can carry containers (6) and/or cabins. The cabins can be for passengers use or for freight. They can be frontal (5.1.1) (5.2.1), central (5.1.2) (5.2.2) or rear (5.1.3) (5.2.3). Due to the modularity of the cabins and containers (6), it is possible to assemble any type of combination using these elements. Whenever necessary, an aerodynamic fairing (7) can be installed over the cabins or containers (6).
Figure 3:
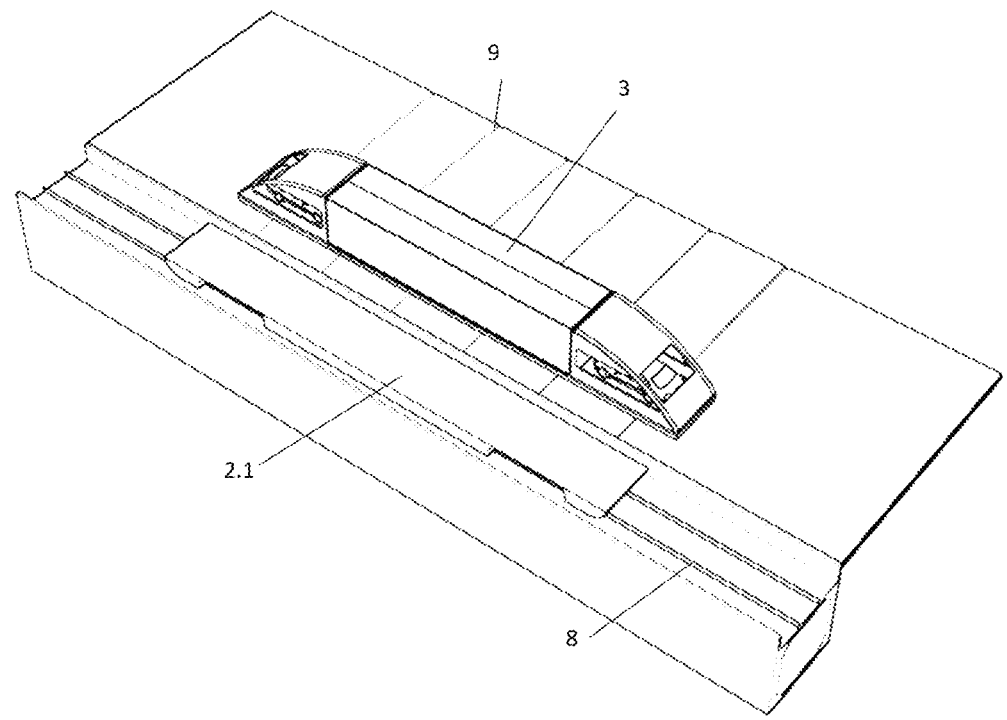
FIG. 3 shows a sliding pier (9) with a mobile upper chassis (3) sliding over a railway type (2.1) for circulation over a railroad (8).
Figure 4:
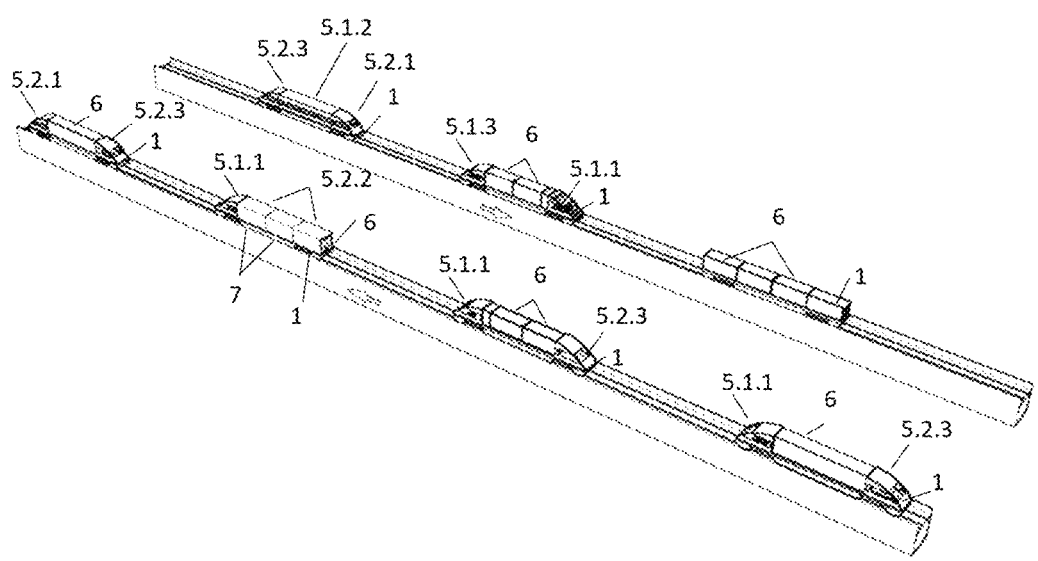

On FIG. 4 it is possible to observe several combinations of carriages (1) with cabins (5.1.1) (5.1.2) (5.1.3) (5.2.1) (5.2.2) (5.2.3) and/or containers (6) that may be covered by aerodynamic fairings (7).

Figure 5:
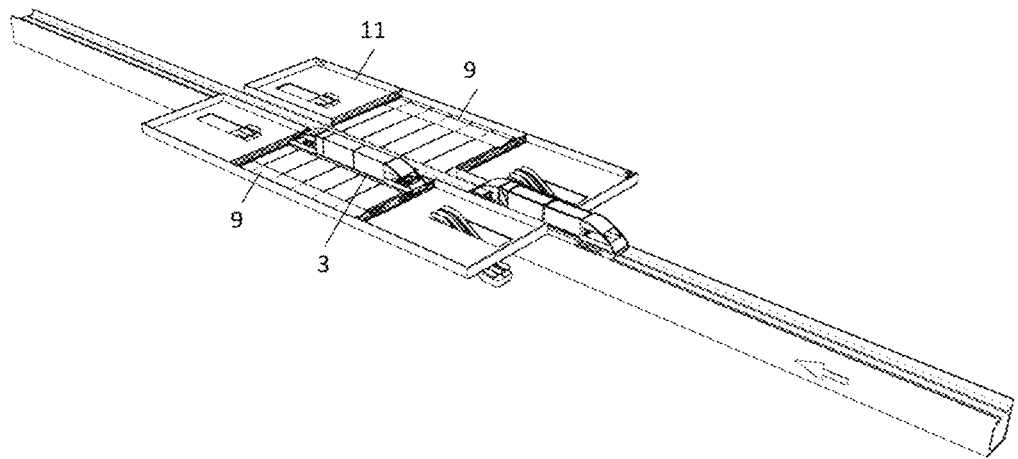

FIG. 5 shows a freight station (11), where a mobile upper chassis (3) waits over the sliding pier (9) to slide over a lower chassis (2) and start to travel.

Figure 6:
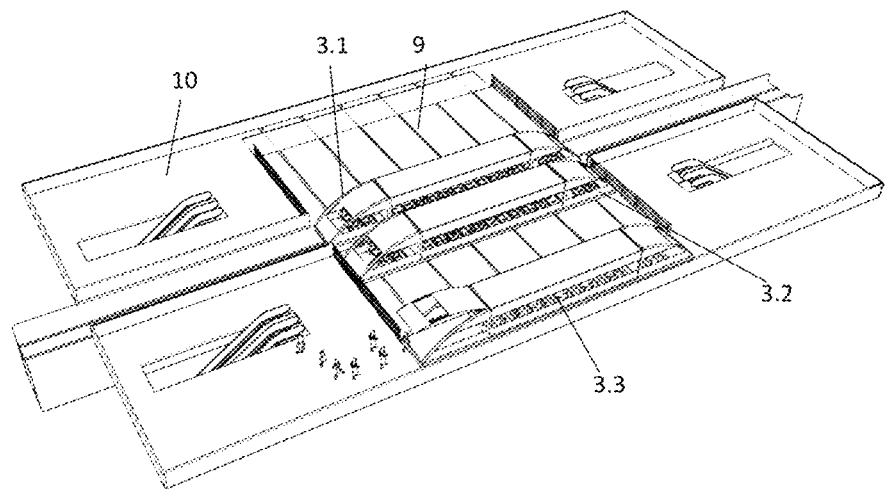

FIG. 6 presents a passenger station (10) with sliding pier (9), where one or several mobile upper chassis (3) with passenger cabins are parked and are being used as boarding room (3.3). When one carriage (1) reaches the station, the arriving mobile upper chassis is unloaded (3.1) by sliding over the sliding pier (9), while the upper chassis prepared to be slided (3.2) are parked at the station waiting to slide over the arriving lower chassis (2).

Figure 7:
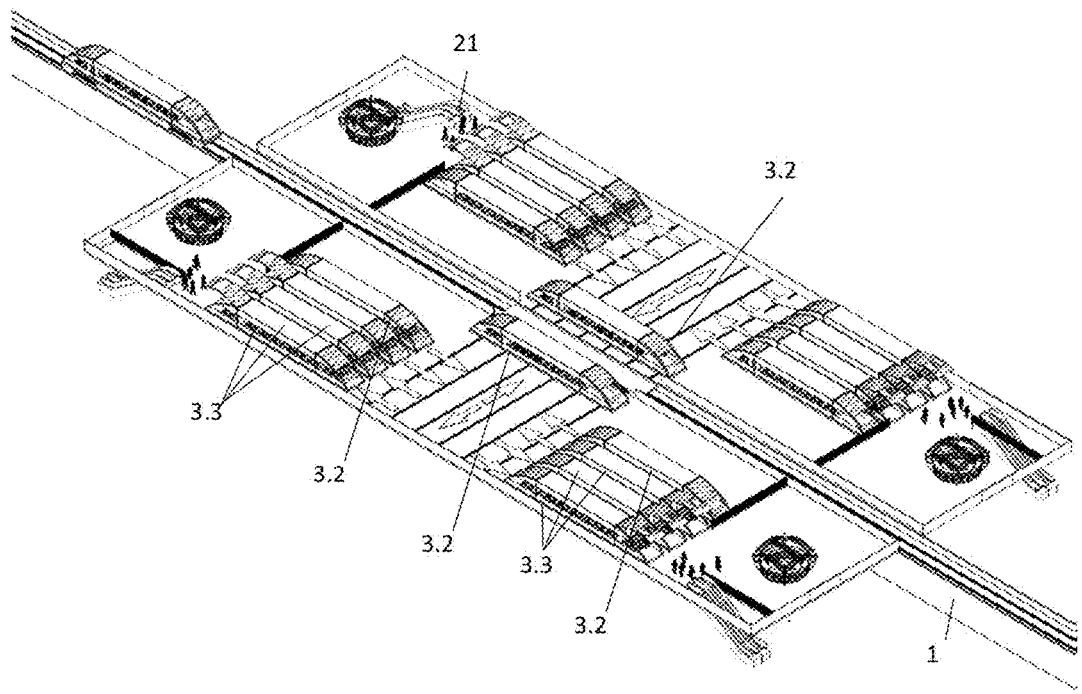

FIG. 7 shows a multidirectional station (21) with several carriages working as boarding room (3.3) and being prepared to be slided (3.2) and others parked.

FIGS. 8a to 8e show a combined or mixed station (12) where the preparation of mobile upper chassis being assembled (3.4) with cabins, either for passengers or freight, is done at a lower level (13.1). Once organized, the mobile upper chassis are moved by elevator (3.5) and go up to the upper level (13.2) using the elevators according to the departure sequence and schedule of the station.

Figure 8A:
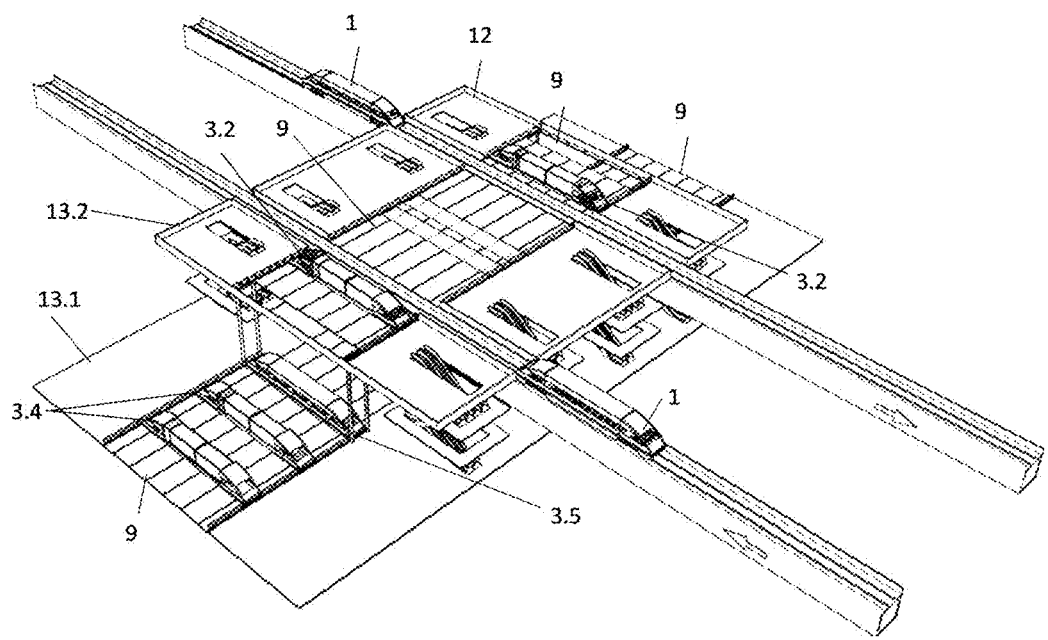

On FIG. 8a it is shown the arrival of two carriages (1) with passenger cabins while two mobile upper chassis with freight cabins prepared to be slided (3.2) are waiting.

Figure 8B:
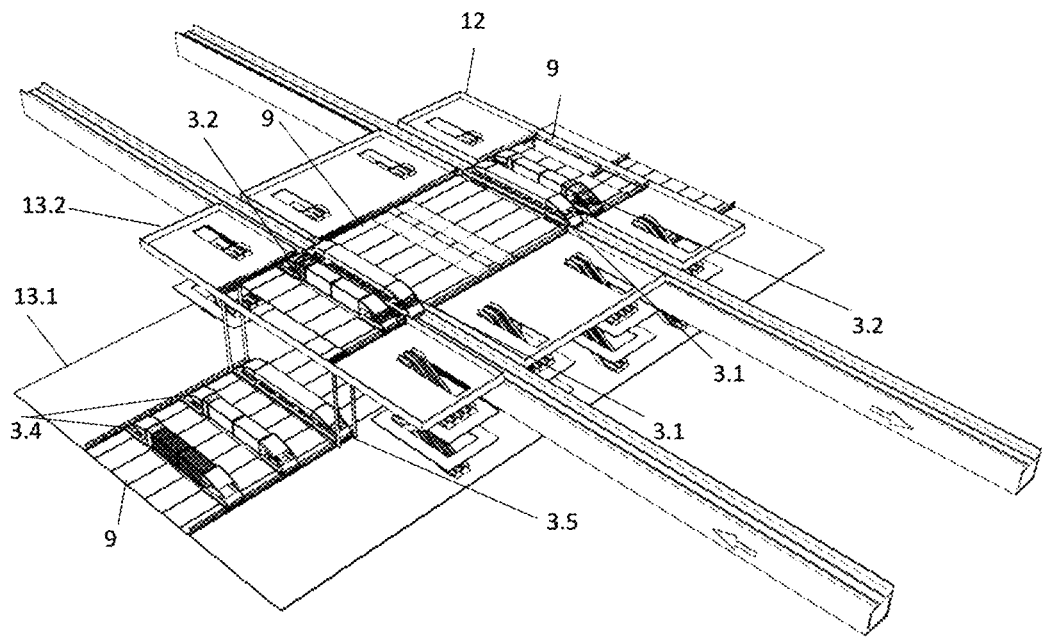

On FIG. 8b the mobile upper chassis is being unloaded (3.1) and the mobile upper chassis prepared to be slided (3.2) are both in sliding position at the combined or mixed station (12).

Figure 8C:
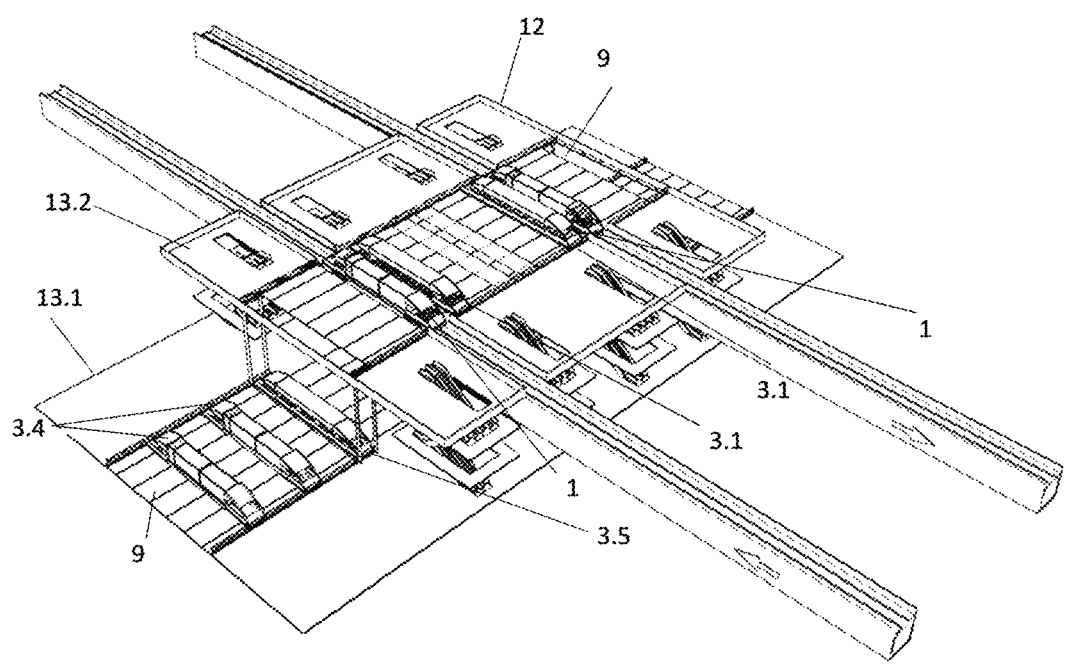

On FIG. 8c the mobile upper chassis being unloaded (3.1) is already sliding over the sliding pier (9) and the mobile upper chassis that were prepared to be slided (3.2) is already sliding over the lower chassis that is ready to leave the station.

Figure 8D:
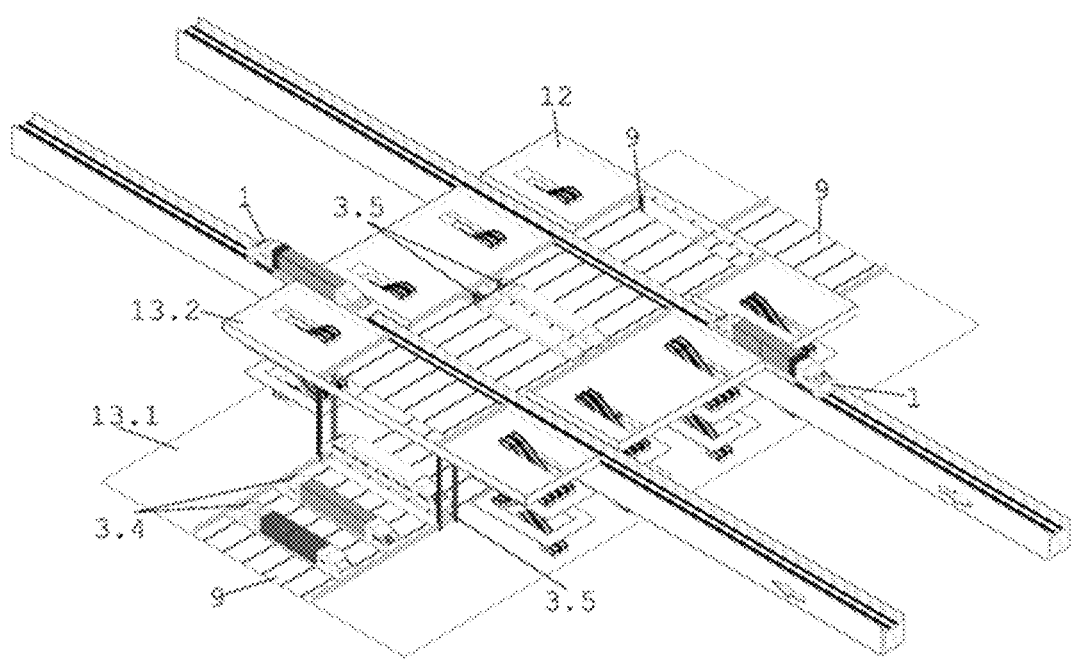

On FIG. 8d the carriages (1) are leaving the station with the new payload and the mobile upper chassis recently arrived are going down to a lower floor using one elevator, while the next mobile upper chassis to be loaded are going up using another elevator.

Figure 8E:
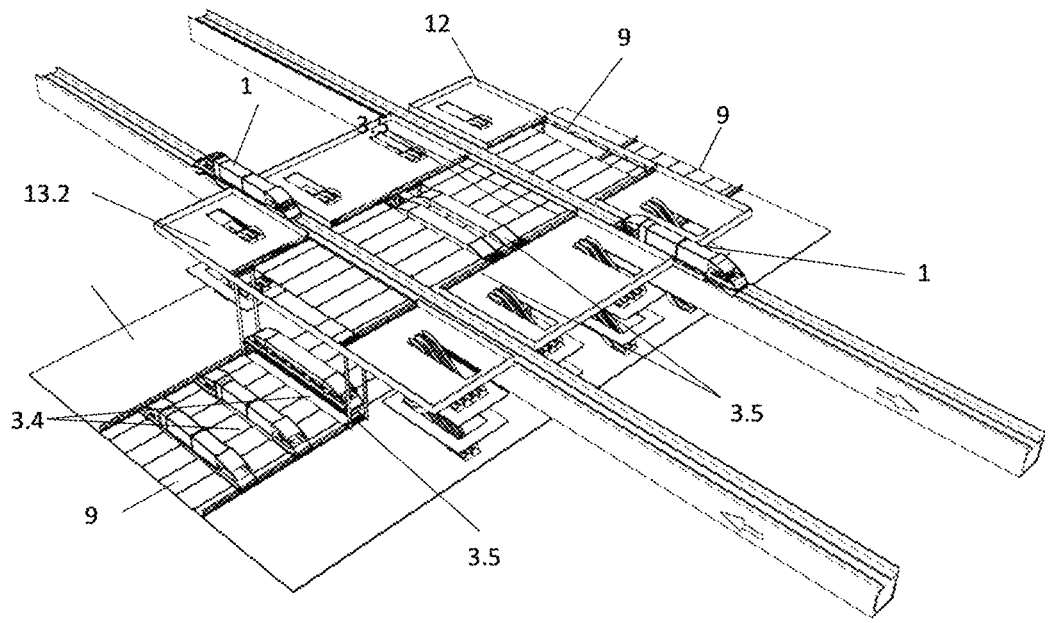

On FIG. 8e the next mobile upper chassis to be loaded is already on the loading floor.

Figure 9:
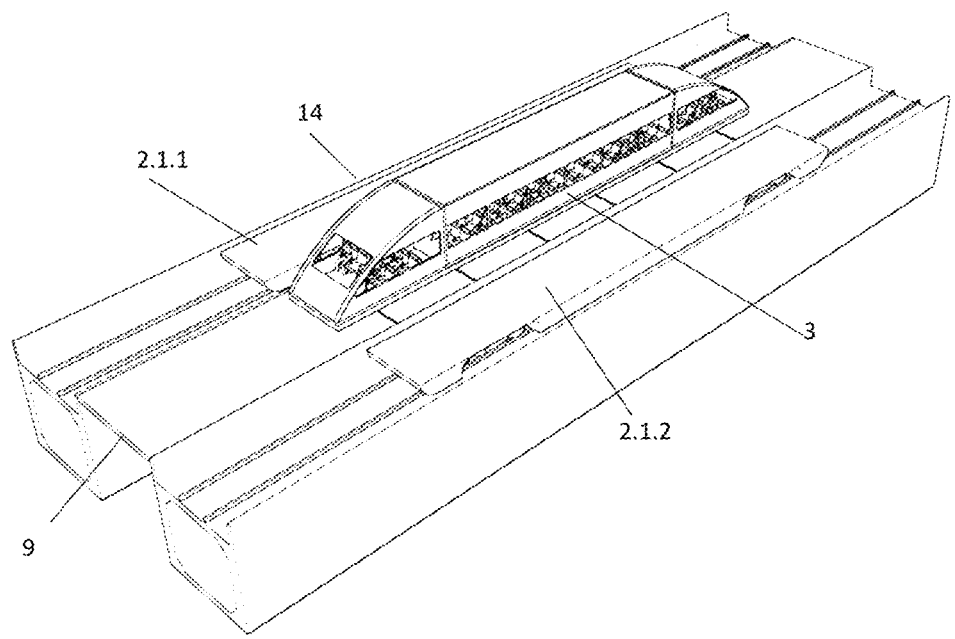

FIG. 9 shows a gauge changing zone (14) where there is one sliding pier (9) and two lower chassis, one is rolling over a track with one gauge (2.1.1) and another one is rolling over another track with a different gauge (2.1.2). Over the sliding pier (9) a mobile upper chassis (3) is sliding from a lower chassis rolling on one gauge (2.1.1) to another lower chassis rolling on a different gauge (2.1.2).

Figure 10:
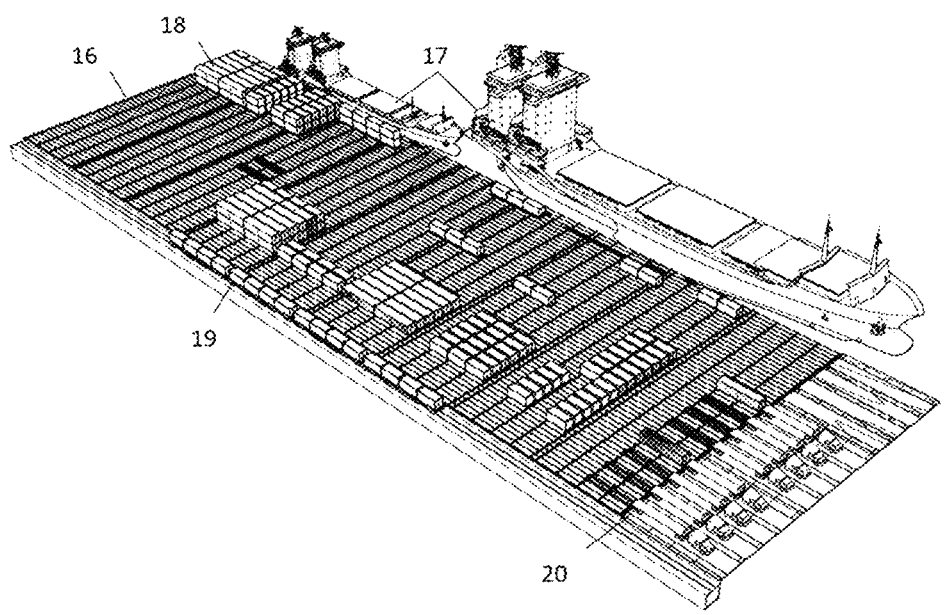

FIG. 10 shows containers at the port mobile stowage zone (16) where containers are unloaded from the ships (17) over lower chassis, that will roll to the container parking zone while waiting to embark (18) for the train loading zone (19), or for the truck loading zone (20).

Figure 11:
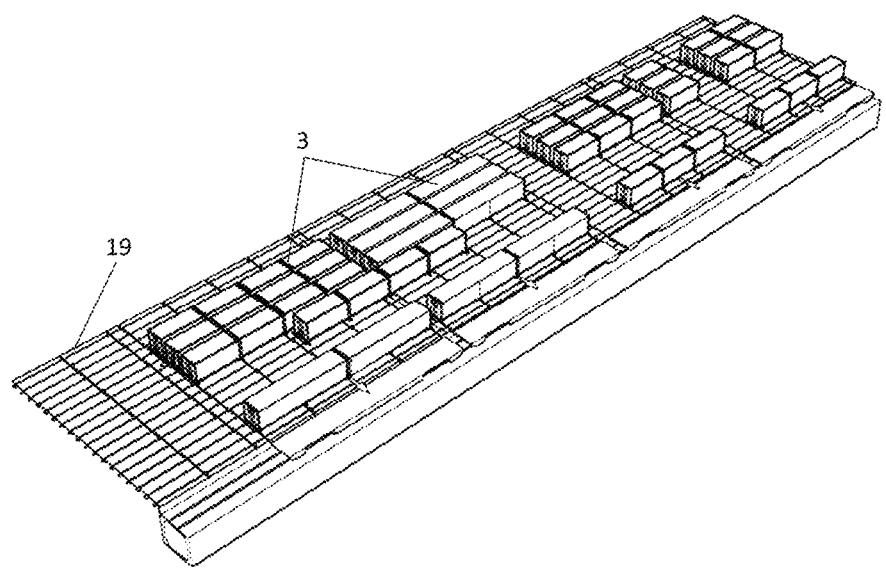

On FIG. 11 the mobile upper chassis (3) loaded with containers move autonomously and in a pre-organized way to the train loading zone (19), where they will later slide over the lower chassis.

Figure 12:
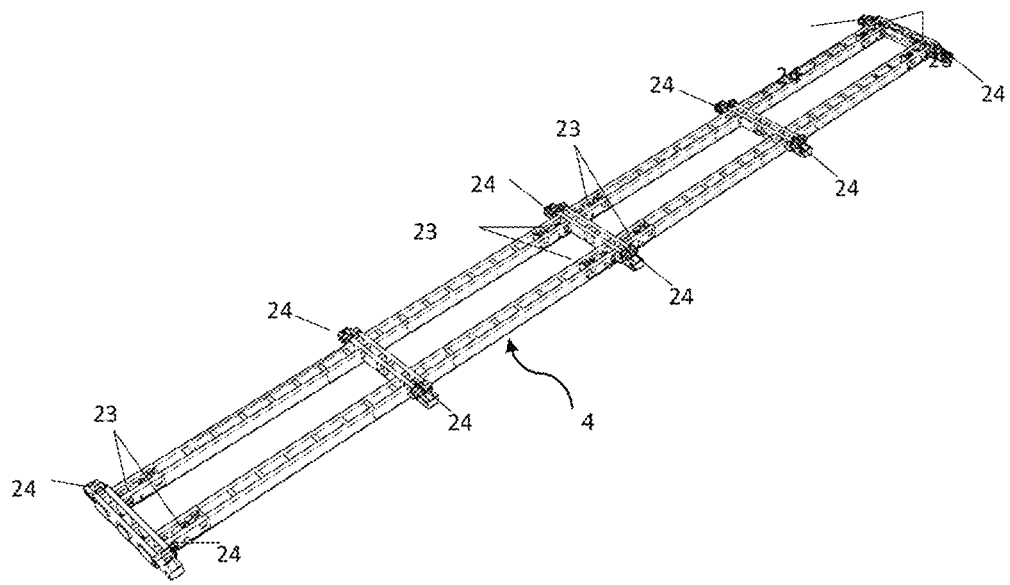

On FIG. 12 it is represented one type of mobile upper chassis with multidirectional wheels, transversal wheels (24) with fixed height, and longitudinal wheels (23), with variable height.

Figure 13:
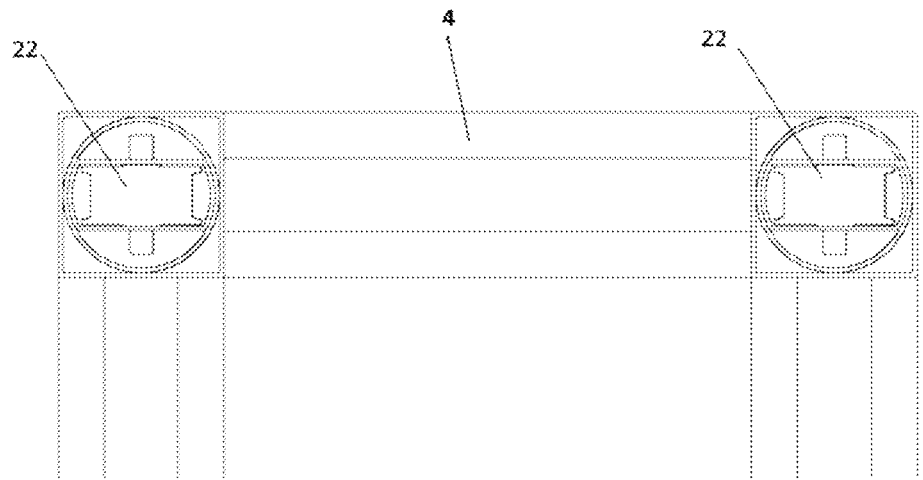

On FIG. 13 it is shown the disposition of multidirectional wheels (22) at the cross of the longitudinal beams with the transverse beams of a mobile upper chassis (3).

Figure 14:
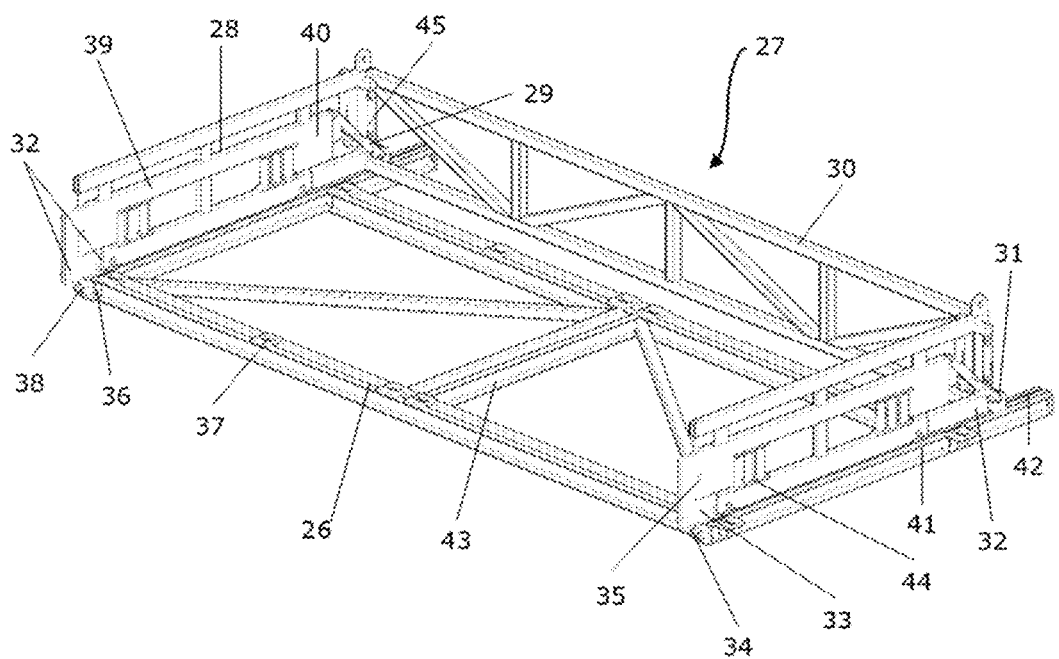

On FIG. 14 it is shown a withdrawable loader (27) working over a multidirectional sliding platform (26), identifying the necessary components to perform the loading and unloading of the container autonomously.

Figure 15A:
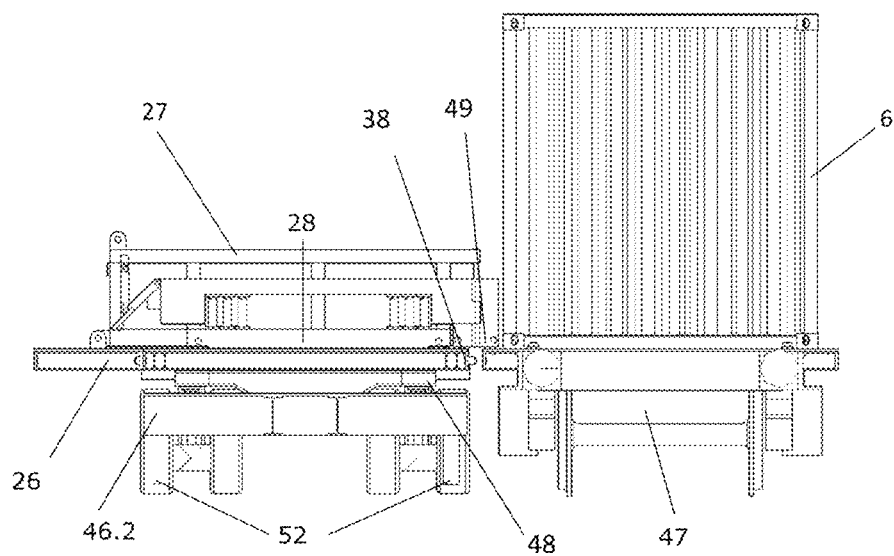

FIG. 15a shows a mobile (46.2) supporting vehicle and the sliding receptor (47) being aligned.

Figure 15B:
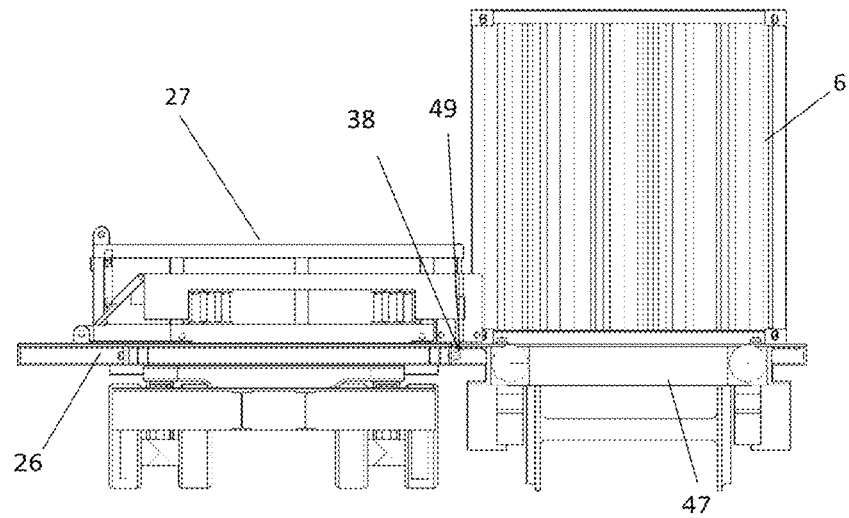

FIG. 15b shows the sliding platform (26) with horizontal male docking pins (38), inserted in the holes of female docking plates (49) of the railway wagon.

Figure 15C:
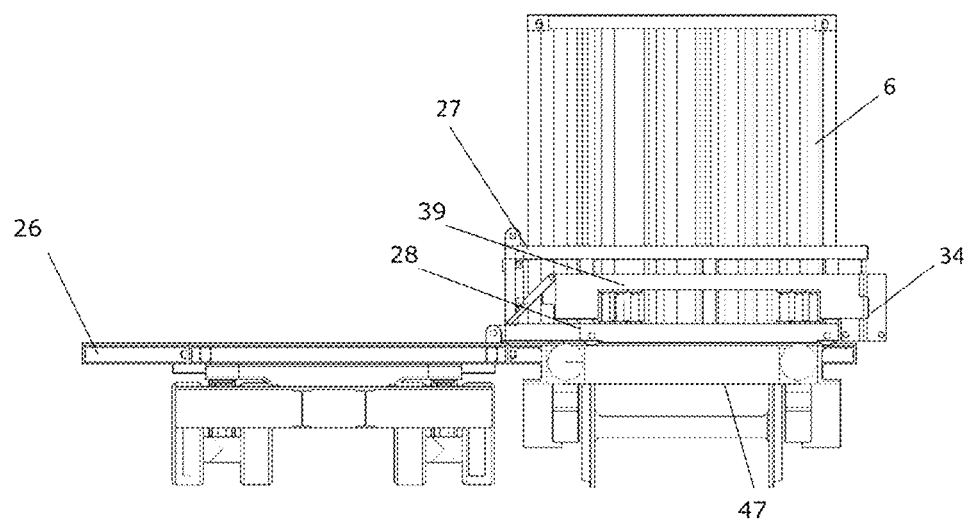

On FIG. 15c the withdrawable loader (27) is moved over the sliding receptor (47).

Figure 15D:
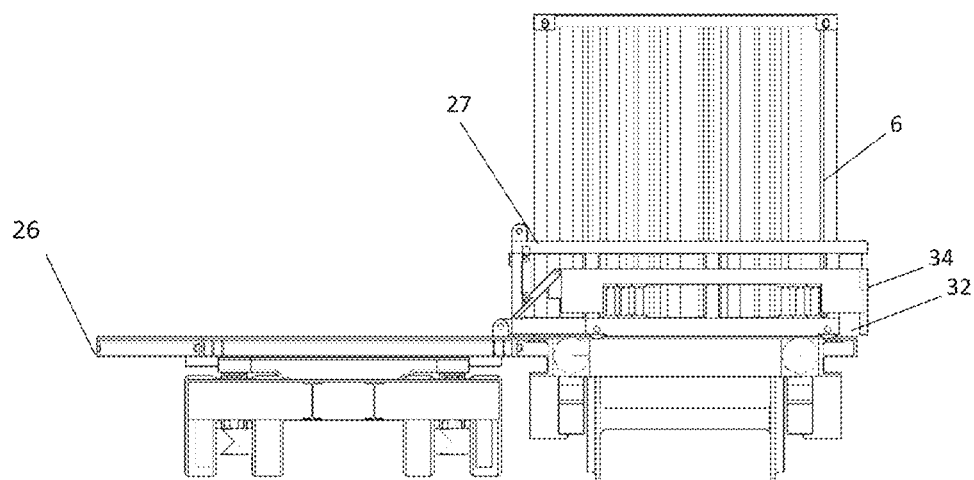

On FIG. 15d the backside connector (34) is turned 90° with the plate parallel to the side of the container (6).

Figure 15E:
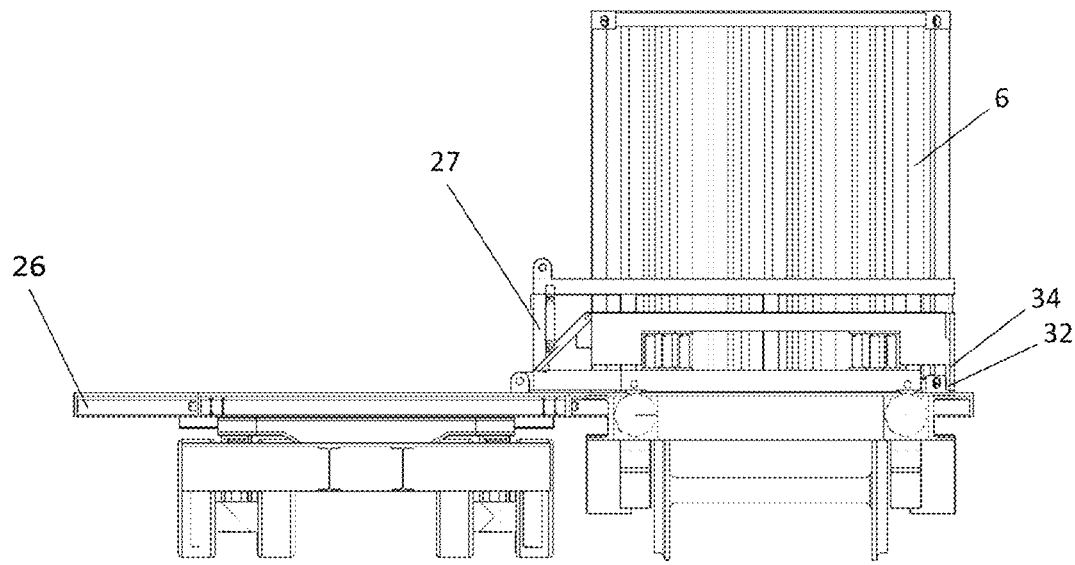

On FIG. 15e the withdrawable loader (27) goes back until the connection pins (32) of the rear side connector (34) are inserted in the holes of the container corners on its back side.

Figure 15F:
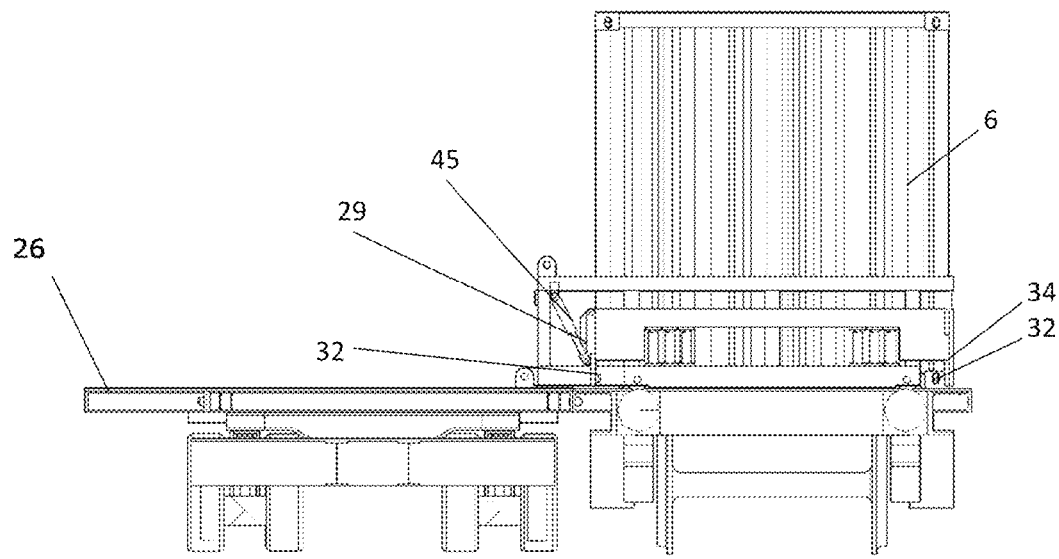

On FIG. 15f the group of front connection jacks (45) of the front side connector (29) move the plate from inclined to vertical position, inserting the connection pins (32) inside the frontal holes of the container corners.

Figure 15G:
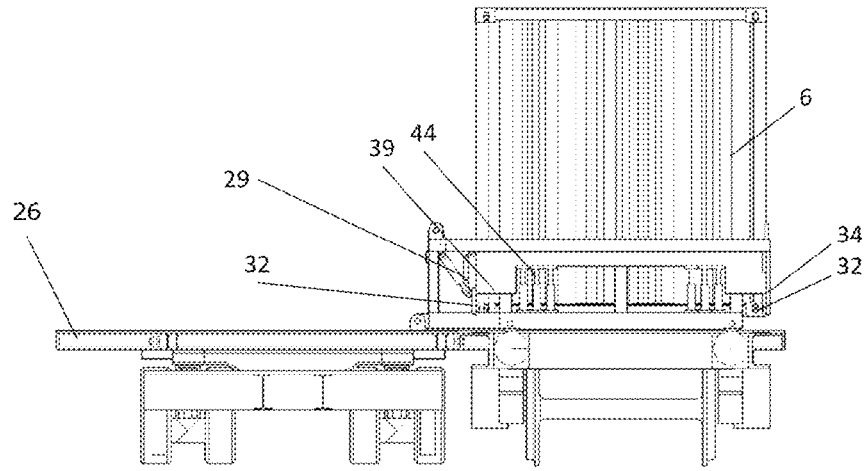

On FIG. 15g the hydraulic jacks (44) of the lifting system (39) lifted the container that stays suspended by the connection pins (32).

Figure 15H:
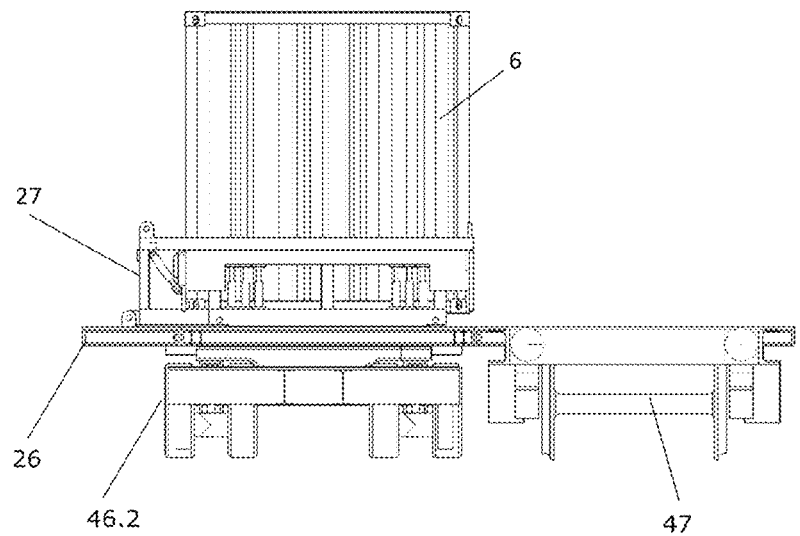

On FIG. 15h the sliding mechanism goes backwards bringing the container from the sliding receptor (47) to the multidirectional sliding platform (26).

Figure 15I:
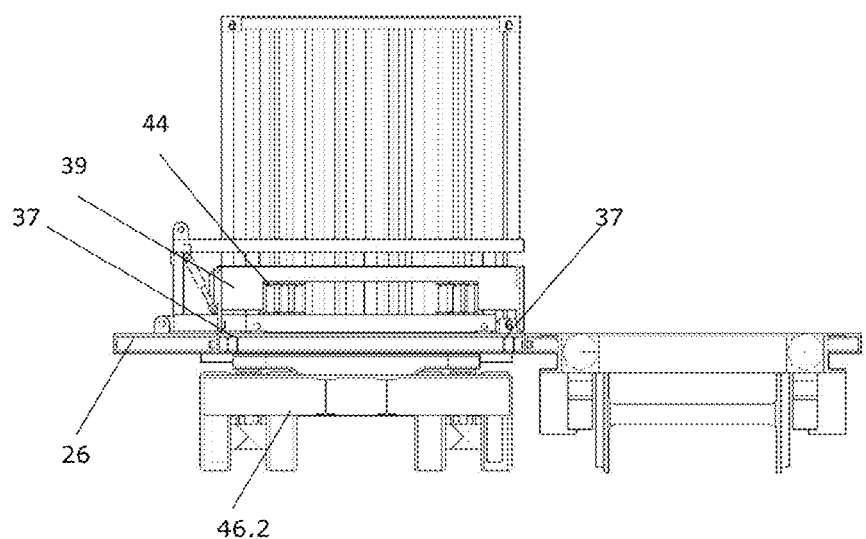

On FIG. 15i the hydraulic jacks (44) of the lifting system (39) lower the container inserting the vertical holes of the corners on the spikes (37) of the multidirectional sliding platform (26).

Figure 15J:
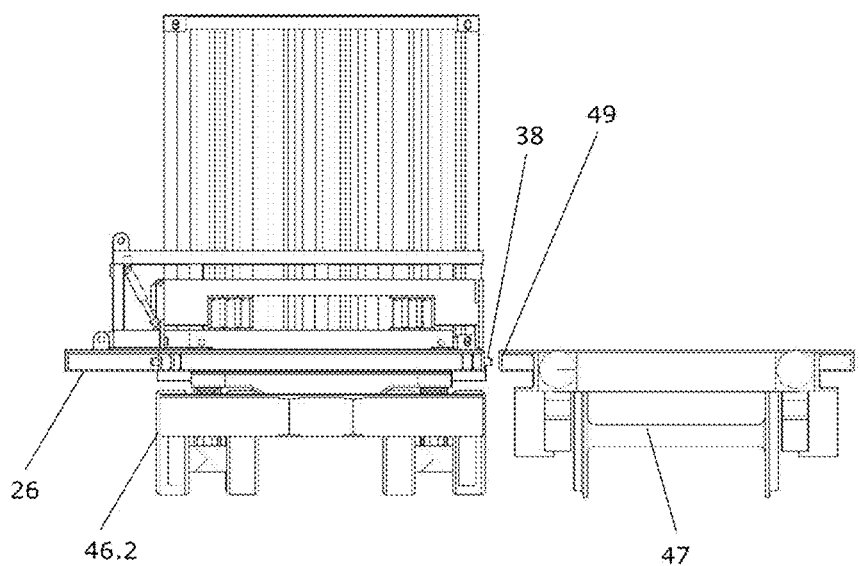

On FIG. 15j the multidirectional sliding platform (26) goes back over the mobile (46.2) supporting vehicle, disconnecting the male docking pins from the sliding receptor (47) ending the sliding process.

Figure 16:
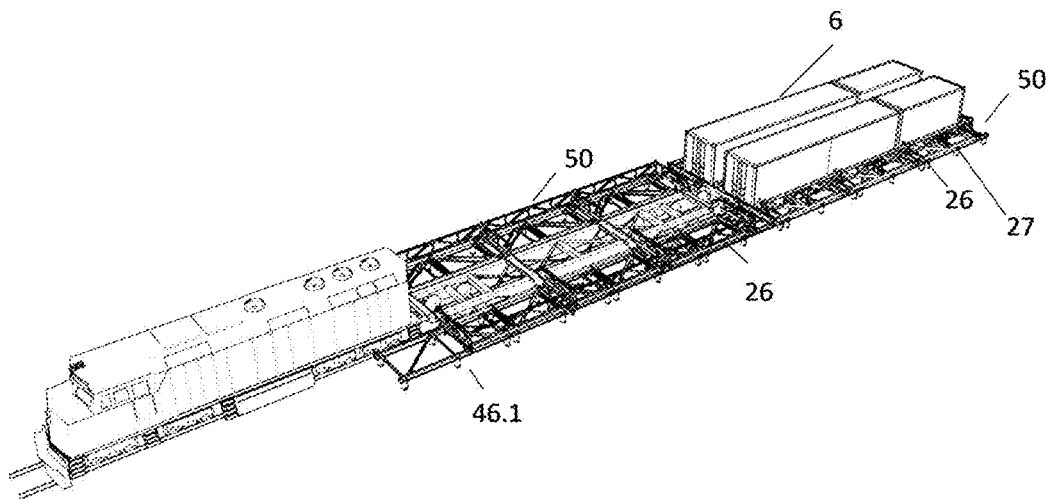

On FIG. 16 a fixed pier (50) is represented and it is made by fixed (46.1) supporting structures (46) that support the multidirectional sliding platform (26) and the withdrawable loader (27) that loads/unloads trains.

Figure 17A:
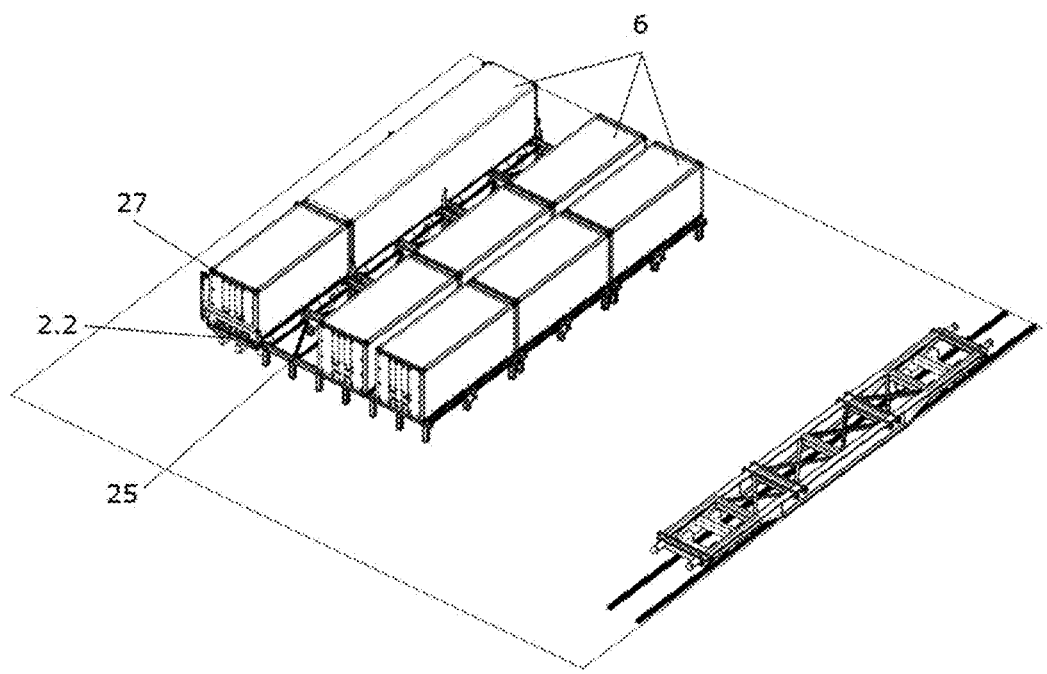

In FIG. 17a a buffer (25) is being loaded by the new equipment that comprises a lower chassis tyre type (2.2) and a witherable loader (27).

Figure 17B:
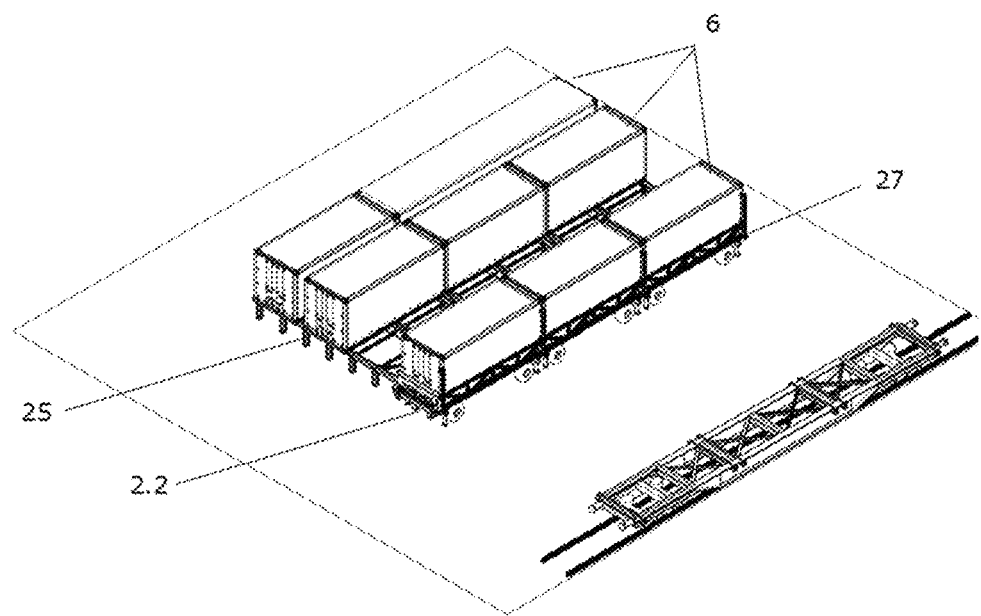

In FIG. 17b the new equipment that comprises a lower chassis tyre type (2.2) and a witherable loader (27) is unloading the buffer (25).

Figure 18:
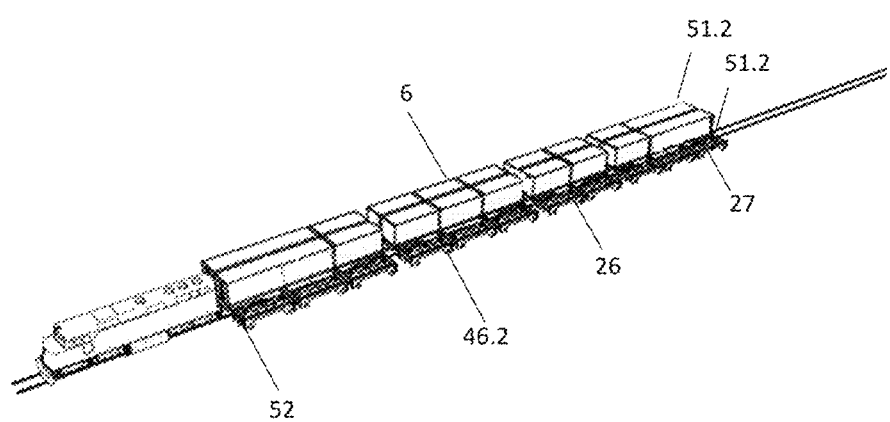

FIG. 18 shows a mobile sliding pier (51.1) (51.2) which is composed by a group of mobile (46.2) supporting structures, multidirectional sliding platform (26) and withdrawable loader (27), which are empty in one side of the railroad (8) in order to unload the train and which are loaded with containers on the other side of the line in order to load the train.

On the drawings it is possible to see the different components of the invention:
1. Carriage
2. Lower chassis
    2.1. Railway type
        2.1.1. One gauge
        2.1.2. Distinct gauge
    2.2. Tyre type
3. Mobile upper chassis
    3.1. Being unloaded
    3.2. Prepared to be slided
    3.3. Working as boarding room
    3.4. Being assembled
    3.5. Being moved by elevator
    3.6. With longitudinal and transversal wheels
    3.7. With multidirectional wheels
    3.8. With unidirectional wheels
4. Platform
5. Cabin
    5.1. Passengers
        5.1.1 Frontal
        5.1.2 Central
        5.1.3 Rear
    5.2. Freight
        5.2.1. Frontal
        5.2.2. Central
        5.2.3. Rear
6. Container
7. Fairing
8. Railroad
9. Sliding pier
10. Passengers station
11. Freight station
12. Combined or mixed station
    13.1. Lower level
    13.2. Upper level
14. Gauge changing zone
16. Port mobile stowing zone
17. Ship
18. Container zone for parking or waiting for new embark
19. Train loading zone
20. Truck loading zone
21. Multiple station
22. Multidirectional wheels
23. Longitudinal wheels
24. Transversal wheels
25. Buffer
26. Multidirectional sliding platform
27. Withdrawable loaderTransfer system
29. Front side connector
30. Arm frame
31. Rotation axle
32. Connection pins
33. Rotational part
34. Rear side connector
35. Hinge
36. Optical sensors
37. Retractable spikes
38. Male docking pins
39. Lifting system
40. Sliding frame
41. Wheels
42. Rail
43. Hydraulic cylinder
44. Hydraulic jacks
45. Front connection jacks
46. Supporting structure
    46.1. Fixed
    46.2. Mobile
47. Sliding receptor
48. Multidirectional sliding supports
49. Female docking plate
50. Fixed pier
51. Mobile sliding pier
    51.1. Loaded
    51.2. Unloaded
52. Vertical stabilization jacks

DETAILED DESCRIPTION OF THE INVENTION

The present invention refers to a new method for loading/unloading train wagons that allows a different type of organization for the use of tracks and rolling stock, optimizing the railway circulation, both for passengers and freight, and it includes the respective equipment and its installation.

"Self-transformable carriages" is the designation of a vehicle composed by a lower chassis (2) and a mobile upper chassis (3) integrating several modular parts.

The invention refers to a method and the equipment necessary for using self-transformable carriages (1), introducing fixed or mobile structures capable of sliding mobile upper chassis (3) over the lower chassis (2) at train stations or logistics and port terminals, and includes:
- Method and equipment to automatically load and unload trains
- Method for sharing chassis
- Method for changing the payload from one gauge track to another gauge track
- Method of mobile stowage at the ports
- Equipment to automatically load and unload trains.

The invention is based on the use of self-transformable carriages (1) in combination with the side sliding loading system (SSL).

Self-Transformable Carriages

The self-transformable carriages (1) are composed by two elements:
- one lower chassis (2) that rolls over the railway
- one mobile upper chassis (3) to transport passengers and/or freight.

Similarly to the lower chassis (2), the mobile upper chassis (3) is equipped with the means to be self-contained, motorized and remotely controlled or circulated with the aid of other motorized equipment, allowing them to carry the load independently of the lower chassis (2).

In order to allow that all carriages (1) can travel in electrified lines or not, namely in secondary lines, the carriages (1) are provided with equipment that enables their connection to the power supply and to distribution systems to the lines, in particular overhead contact lines, as well as alternative motorization systems for autonomous circulation.

By controlling distance and relative speed, several carriages (1) with independent destinations on the same line, one behind the other, coupled or with a safety distance between them, calculated in function of the speed and characteristics of the track, can run.

The railway circulation can be done in queue by the main tracks, using deviations for the stations (10) (11), similar to the deviations for service areas in highways.

The carriages (1) enter the stations (10) (11) by the slowdown tracks, make a stop for changing the mobile upper chassis (3) and return to the main track by the acceleration tracks, reaching the maximum speed of circulation at the main track.

The circulation time slot and the distance between carriages (1) is adjusted at each station (10) (11), in order to coordinate the carriages (1) entering and leaving the stations (10) (11) with the carriages (1) traveling in the main track.

The control of entering and leaving the stations (10) (11) as well as the change of cabins (5) is controlled by the central traffic control.

The mechanical method to couple the lower chassis (2) to the mobile upper chassis (3) can be, namely but not exclusively, hydraulic or magnetic, or any other type as long as it allows the chassis to be locked against each other.

In special or emergency situations all carriages (1) can be manually operated or towed.

Lower Chassis

There are two types of lower chassis (2):
Autonomous and motorized
Towed or pushed.

The lower chassis (2) can be railway type (2.1) or tyre type (2.2).

The railway type (2.1) have wheels (41) and roll over rails.

The tyre type (2.2) may roll over roads or port grounds and are used for supporting operations required by the organization of the mobile upper chassis (3) logistics. They can be autonomous, motorized or remote controlled.

The transverse beam that contain the sliding mechanisms have fitting systems that allows a perfect match with the mobile upper chassis (3).

The connections between mobile upper chassis (3) composed by cabins (5) are done using vertical blocking systems, preventing the displacement of the cabins (5) in any situation, including extreme breaking ones.

The vertical connection system of the lower chassis (2) allows the assembling of any type of mobile upper chassis (3) over the lower chassis (2).

The lower chassis (2) can be equipped with mechanisms that allow loading or unloading transversally the mobile upper chassis (3), which is already coupled or about to be coupled.

This side sliding loading system also allows the unloading of one mobile upper chassis (3) to one side, simultaneously with the loading of another mobile upper chassis (3) by the other side.

The lower chassis (2) may have its own equipment to load or unload transversally the mobile upper chassis (3). These systems can be mainly hydraulic using jacks with automatic repositioning that move transversally the mobile upper chassis (3) using horizontal jacks with successive repositioning claws.

The lower chassis (2) is equipped with vertical jacks that allow the vertical leveling, and guiding laser systems for its longitudinal positioning, allowing a correct alignment with the mobile upper chassis (3).

The lower chassis (2) has its own equipment for making its longitudinal immobilization with high precision at any loading pier.

Due to the flexibility of the suspensions, four vertical hydraulic jacks (44) are installed, per chassis, stabilizing transversally the lower chassis (2) guaranteeing its horizontality during the sliding operation.

The motorization of the railway type (2.1) lower chassis (2) is made namely but not exclusively by: electricity by overhead contact lines, by third rail, by batteries, or by diesel engines or GPL, or hybrid engines.

The motorization of tyre type (2.2) lower chassis (2) is made namely but not exclusively by: electricity by batteries, or by diesel engines or GPL, or hybrid engines.

All the hydraulic systems used in the lower chassis (2) and corresponding oil tanks are connected to the same hydraulic central that is placed inside the structure of the lower chassis (2).

The selection of type of motorization along the route is done by remote control or automatically.

When using overhead contact lines to power the railway type (2.1) lower chassis (2) has a telescopic elevator that allows the pantograph to reach the overhead contact line.

These lower chassis (2) are preferably autonomous and remote controlled from a centralized system in a traffic control centre. They are also equipped with various integrated safety systems, some of them redundant.

Mobile Upper Chassis

The mobile upper chassis (3) are built in two types:
Motorized and autonomous,
Non-motorized, being towed or pushed by external handling equipment that are mechanically attached to these chassis.

The mobile upper chassis (3) consist of assemblies made up of platforms (4) carrying containers (6) and/or cabins (5). The cabins (5) can be for passenger (5.1) or for freight (5.2). These can be frontal (5.1.1) (5.2.1), central (5.1.2) (5.2.2) or rear (5.1.3) (5.2.3). Due to the modularity of the cabins (5) and of the containers (6), it is possible to arrange any type of combination with these elements. In case it becomes necessary it is possible to place fairings (7) over the cabins (5) or over the containers (6). The frontal (5.1.1) (5.2.1) and rear (5.1.3) (5.2.3) cabins maybe identical and symmetric, enabling its use at any end of the composition, and in any direction of the movement.

Due to the possibility of existing three different locations for placing the cabins (5), frontal (5.1.1) (5.2.1), central (5.1.2) (5.2.2) and rear (5.1.3) (5.2.3), as well as the containers (6) above the platform (4), there are mechanisms that guarantee the approaching movement, the coupling and fixing of those structures between themselves, namely but not exclusively, hydraulic or magnetic mechanisms.

All types of mobile upper chassis (3) can move transversally, longitudinally or in both directions above the sliding piers (9), prepared for this purpose, namely but not exclusively, by rails (42) or magnetic bands, allowing its exchange and organization over a horizontal floor without intervention of vertical handling machinery.

The mobile upper chassis (3) have their own means for operation. As well as the lower chassis (2), they can be autonomous, motorized and remote controlled or circulate with the help of other power-driven equipment, allowing them to carry the load independently of the lower chassis (2).

The cabins (5) which are parts of the mobile upper chassis (3) are designed according to its use, namely:
Passengers
Ambulance/hospital
Post
Sea containers
Frigorific containers
Aeronautic containers
Freight in small containers
Car transportation or other vehicles.

The mobile upper chassis (3) move preferably over rails (42), orthogonally, following the two horizontal directions. The mobile upper chassis (3) are composed by metallic platforms (4) made with two longitudinal beams and several transversal beams where the motion devices are installed.

The mobile upper chassis (3) is equipped with wheels (41) that are assembled namely but not exclusively:
On the longitudinal beams for the longitudinal directions and at the transversal beams for the transversal direction, originating mobile upper chassis with longitudinal and transversal wheels (3.6).
On the intersection of the longitudinal beams with transversal beams, using in this case multidirectional wheels (22), originating mobile upper chassis with multidirectional wheels (3.7).
Wheels (41) on one single direction originating the upper chassis with unidirectional wheels (3.8).

When using wheels (41) for both directions, the transversal wheels (24) are set at a fixed level while the longitudinal wheels (23) are set at a variable level. The longitudinal wheels (23) are equipped with hydraulic elevation systems that allow them to go up or down. When the longitudinal wheels (23) are at a level lower than the transversal wheels (24), the mobile upper chassis (3) with longitudinal and transversal wheels (3.6) stays only supported by the longitudinal wheels (23), allowing its motion in this direction. When the longitudinal wheels (23) are lifted inside the longitudinal beams, the mobile upper chassis with longitudinal and transversal wheels (3.6) is only supported by transversal wheels (24) allowing its motion in the transversal direction.

When using mobile upper chassis (3) with multidirectional wheels (3.7) the rotation axle (31) is placed inside the mobile upper chassis (3) at the intersection of longitudinal and transversal beams, being the rotation of the wheels (41) either free or commanded by the hydraulic system. In addition, there is a vertical jack in each wheel making them to go down, placing them in service mode or bringing them up immobilizing the mobile upper chassis (3).

When using wheels (41) in only one direction, they are placed in the sliding direction, to slide the upper chassis with unidirectional wheels (3.8) from the railway type (2.1) or tyre type (2.2) lower chassis (2) towards the sliding pier (9) or vice-versa.

The mobile upper chassis (3) has a longitudinal length adequate to the task it is designed for.

In the case of container (6) transports, over the transverse beams are installed special devices such as vertical spikes or end stoppers that can be operated automatically or manually, and that allow the docking and fixing of the mobile upper chassis (3).

The docking of the cabins (5) is done using vertical spikes, blocking the displacement of the mobile upper chassis (3) in any direction and in any situation.

When the mobile upper chassis (3) is composed by several parts, they are assembled together over the pier, coupling themselves longitudinally, forming a set with the length of the mobile upper chassis being assembled (3.4) that is then ready to be loaded by sliding.

The coupling systems can be either hydraulic or magnetic, and they are placed at the level of the longitudinal and transverse beams, allowing the docking and fixing of the structures of the mobile upper chassis (3).

In the mobile upper chassis (3) that are motorized, all the components rest below the upper web of the transversal beams.

In the case that the mobile upper chassis (3) is motorized, the sliding is done by its own motion equipment.

Side Sliding Loading (SSL)

The side sliding loading method is performed using the sliding pier (9), which has installed the necessary equipment for the displacement of the mobile upper chassis (3). This equipment includes, namely but not exclusively, rails (42) or plain surfaces equipped with laser or magnetic guiding systems.

The sliding pier (9) is a structure built with the purpose of allowing the loading of the mobile upper chassis (3) over the lower chassis (2).

On these structures, lateral sliding normally does the loading of the mobile upper chassis (3) over the lower chassis (2).

However, the mobile upper chassis (3) may also be loaded or unloaded by:
lifting equipment
with other vehicles that can pull or push
by longitudinal sliding.

The mechanical method for sliding the mobile upper chassis (3) is, namely but not exclusively, hydraulic or magnetic, helped whenever necessary ny positional control systems, namely but not exclusively, by laser or magnetic band.

Considering the objective of using the self-transformable carriages (1) in different types of tracks and stations (10) (11), namely the existing ones, there are several configurations for integrating the sliding mechanical systems to load the mobile upper chassis (3):
integrated in the lower chassis (2)
integrated in the mobile upper chassis (3)
integrated in the sliding pier (9)
combined.

A specific software is used to make the conjugation of the movements of the lower chassis (2) and those of the mobile upper chassis (3) which are loaded over them.

Sharing Chassis Method

The sharing chassis method is based on changing the operation mode of the railway tracks achieved with self-transformable carriages (1) and sliding piers (9), that allow the exchange, the loading and unloading of mobile upper chassis (3) over the lower chassis (2) assembling self-transformable carriages (1). The sharing occurs for carriages (1) designed to transport passengers, freight or mixed configurations with passengers and freight.

This solution allows the automatic configuration of each carriage (1) at the sliding pier (9) according to the existing demand for passengers or freight transportation, on real time.

The sharing method allows that the mobile upper chassis (3) can circulate in any type of track, normal or high speed, as at the sliding piers (9) they can be coupled with lower chassis (2) that respect the requests of monitoring and safety of any type of track.

Passenger Stations

The passenger stations (10) allow the operation of lower chassis (2) designed to operate the passenger (5.1) cabins. These passenger (5.1) cabins have the advantage of having the capacity of working as boarding room (3.3). This way, the passengers can access to the passenger (5.1) cabins as soon as they arrive to the station, start their work or rest, situation that normally only occurs at the starting stations of the trip.

In this situation, when the lower chassis (2) arrives, the passenger (5.1) cabins is already prepared to be slided (3.2) over the lower chassis (2).

Normally the loading of new passenger (5.1) cabins is preceded of the unloading of other passenger (5.1) cabins to the opposite side.

At stations (10) (11) or time schedules with few passengers, the carriages (1) may stop in a conventional way by the train side doors, not needing to slide the mobile upper chassis (3) to embark or disembark passengers.

Freight Stations

The freight stations (11) allow the operation of lower chassis (2) loaded with containers (6) and/or freight (5.2) cabins.

The freight stations (11) have exactly the same operation method as the presented before for passenger stations (10) having next to them a parking and preparation zone (for freight cabins or containers) where the payload is organized by the entrance order over the lower chassis (2).

Combined or Mixed Stations

At the combined or mixed stations (12) it is possible to load mobile upper chassis (3) with freight (5.2) cabins, and/or with passenger (5.1) cabins, and/or containers (6). These combined or mixed stations (12) can be organized by levels (13.1) (13.2).

As the mobile upper chassis (3) have their own translation means it is possible to organize them following their entrance order in the main track before they are led to the pier.

With the progressive start of operation of the self-transformable carriages (1) the tendency is that the new stations are combined or mixed stations (12), as they allow a better optimization of the utilization of the track, due to the facility that they provide inserting freight trains between passenger trains, eliminating wasted time.

Changing Track Gauge Method

The changing track gauge method is obtained using the sharing chassis method, implemented, by sliding the mobile upper chassis (3) from one lower chassis (2) that runs on a track with a specific gauge, to another lower chassis (2) that runs on a track with another gauge.

This operation will preferably be done by sliding the mobile upper chassis (3) from the lower chassis (2) that runs on a track with a specific gauge to a gauge changing zone (14), and later sliding this mobile upper chassis (3) from that changing gauge pier to another lower chassis (2) running over another gauge.

It is possible to align the lower chassis (2) with different gauges side by side, and slide directly the mobile upper chassis (3) from one composition to the other. In this case the lower chassis (2) have a special adaptation to pass over the gap between them.

In the situation where the changing of gauge occurs in a cross-border area, this change can be used for customs and/or for border control before the mobile upper chassis (3) slides over the lower chassis (2) of the other gauge.

Mobile Stowage in Ports

With this new side sling system and its equipment brings a new way of stowing containers in ports. The AGV-SSL vehicles allow an organization of containers over buffer fixed structures were AGV-SSL can deposit and pick up the containers whenever they have to leave the port.

The Equipment

The withdrawable loader (27) is a system that allows loading and unloading railway wagons or other vehicles in an autonomous, simultaneous and remote controlled way.

The withdrawable loader (27) embraces the containers (6), one by one, two by two, three by three or four by four, being able of lifting or lowering the pack of containers (6) and displace them transversally between the withdrawable loader (27) base and one sliding receptor (47); namely but not exclusively a railway wagon, one semi-trailer, one fixed structure, or any other type of sliding receptor (47). This withdrawable loader (27) is installed over a supporting structure (46.1) (46.2) that can be an autonomous or towed vehicle or an easel, depending on the functionality it is destined to have.

The withdrawable loader (27) has the triple function of connecting, lifting and transferring the containers (6), being equipped for that with front side connectors (29), rear side connectors (34) and by of lifting and lateral moving means which are made up of a set of metal parts, hydraulic equipment and laser systems for position identification.

Transfer System

The transfer system (28) is made with a rigid frame steel structure inside of which there is a sliding frame (40) where the lifting system (39) travels.

This system allows to transfer containers (6) transversally to the sliding receptor (47) or fixed pier (50), with the motion done preferably with wheels (41), built in the transfer system (28) that roll over rails installed over the multidirectional sliding platform (26) and over the sliding receptor (47). This movement can also be done installing a ski under the transfer system (28) and rollers placed over the multidirectional sliding platform (26) and over the sliding receptor (47).

For performing the movement, it is preferably stipulated to use hydraulic cylinders (43) installed between the multidirectional sliding platform (26) and the withdrawable loader (27), pushing it to the sliding receptor (47) and vice-versa. Another motion system is using gear wheel electric engines running over a rack, that will pull the transfer system (28).

Lifting Systems

The lifting system (39) is a frame guided by vertical sliding frames (40) and moved vertically relatively to the transfer system (28) by a group of hydraulic jacks (44). This frame holds the front side connectors (29) and the rear side connectors (34) that lift and hold the containers (6).

Front Side Connector and Backside Connector

There are two types of connector systems: one front side connector (29) and one rear side connector (34) that have connection pins (32) that will be inserted the side holes of the normalized corners of the containers (6).

The connection pins (32) have the necessary dimensions to be inserted in the corner holes without letting the containers (6) fall down, and without colliding with twist-locks or spikes (37) that may be inserted in the corner holes vertically.

A group of jacks bi-articulated and one fork-shaped metal plate composes the front side connector (29), whose slot fits on the transfer system (28). This plate has two connection pins (32) to connect the containers (6). The plate has hinged connections, at one end to the lifting system (39), and at the other end to a group of front connection jacks (45) that have another hinged connection to the transfer system (28). This way when the lifting system (39) goes up, the plate goes from an inclined-resting position to a vertical-forced position, pushing the plate against the container (6), which stays wedged against the rear side connector (34). This way the connection pins (32) cannot go out of the container (6) corner holes.

The rear side connector (34) is made of two parts, one hinge (35) and another one rotational part (33) that can rotate 90° between them. In the resting position—0°—the two plates are juxtaposed, in a way the pair does not exceed 60 mm thickness, allowing that the arms of the withdrawable loader (27) can move between containers (6) which should be placed at the normalized distance of 74 mm between them, as it occurs in railway wagons.

In the rotated position—90°—the rotational part (33), where two connection pins (32) are placed, stays parallel to the container (6) side and blocked in this position enabling their insertion in the containers (6) corners.

The arms of the withdrawable loader (27) of the same container (6) are braced together by an arm frame (30) that since it is parallel to the sidewall of the containers (6) guarantee the synchronism of their movement and consequently the adequate sliding of the containers (6).

Then the lifting system (39) lifts the container by the small jacks and the braced arms of the withdrawable loader (27) slide over a multidirectional sliding platform (26) which is made with steel beams. The base is connected to the supporting structure (46.1) (46.2) by a system of multidirectional slider supports (48) that allow a fine multidirectional adjustment at the horizontal level of the withdrawable loader (27) relatively to the sliding receptor (47).

The ends of the bases of the multidirectional sliding platform (26) are equipped with male docking pins (38) that allow a perfect coupling between the multidirectional sliding platform (26) and the sliding receptor (47) where female docking plates (49) are installed for the sliding process. Inside the male docking pins (38) laser guidance systems are installed to allow automatic docking between the multidirectional sliding platform (26) and the sliding receptor (47).

Supporting Structures

The supporting structure (46) can be fixed (46.1) or mobile (46.2).

The fixed (46.1) supporting structure (46) can be made of concrete or steel and are used to support the multidirectional sliding platform (26) that in this situation have lifting systems integrated so that they can level themselves with the sliding receptor (47).

The mobile (46.2) supporting structure (46) can be autonomous or towed, over tyres, wheels (41) or caterpillar, and they have vertical stabilization jacks (52) installed to allow their vertical leveling relatively to the sliding receptor (47) and to stabilize the two during the sliding process.

Fixed Piers

The fixed piers (50) are composed by fixed (46.1) supporting structures that support multidirectional sliding platform (26) and withdrawable loader (27) modular, installed parallel to rail tracks, at one or both sides that allow the loading and unloading of railway trains in an autonomous and synchronized way. In this case the multidirectional sliding platform (26) have longitudinal jacks with longer rods to allow its longitudinal positioning with the several types of existing railway wagons.

Mobile Piers

The mobile piers (51.1) (51.2) are composed by mobile (46.2) supporting structures (46) above which the multidirectional sliding platform (26) and the withdrawable loader (27) are installed.

In order to match the different typologies of existing railway wagons, autonomous or towed vehicles of several lengths will be used so that there is a correspondence with the wagons they will be associated with.

The mobile piers (51.1) (51.2) can change their location, anytime, at the port or at a terminal, clearing the place from any infrastructure that might compromise future layouts of the port or terminal.

With this solution as soon as the train is unloaded, the mobile pier vehicles disassociate and transport immediately their loads to any other zone of the park or terminal.

Another great advantage of this solution is that these vehicles, while not serving as pier, they can do all the transportation services inside the port or terminal doing several logistic operations of freight organization.

It should be noted that the containers (6) once loaded over these vehicles no longer need to be lifted by another system, what brings a significant economy relatively to the use of equipment and operational staff.

Withdrawable Loader

This innovative system has immediate use for changing gauge stations that can be installed at border stations or terminals.

It also allows the transfer of cabins (5) between urban and sub-urban trains.

In the particular case of containers (6) it allows to load trains with different lengths and number of wagons in the same time.

Either in fixed piers (50) case or in mobile piers (51.1) (51.2) case, a certain series of movements is necessary to make the sliding process:

a) The multidirectional slider supports (48) move the multidirectional sliding platform (26) in order to adjust the position of the withdrawable loader (27) arms with the sliding receptor (47);
b) The multidirectional sliding platform (26) travels in the transversal direction in a way the male docking pins (38) of the multidirectional sliding platform (26) are inserted in the female docking plates (49) of the railway wagon;
c) The withdrawable loader (27) arms goes to the sliding receptor (47) leaving the transfer system (28) and lifting system (39) parallel to the smaller sides of the containers (6);
d) The rear side connector (34) rotates 90° leaving the plate parallel to the side of the container (6);
e) The withdrawable loader (27) goes back until the connection pins (32) of the rear side connector (34) are inserted in the corner holes of the container (6) back side;
f) The front connection jacks (45) of the front side connector (29) is activated in order to move the plate form the inclined position the vertical position, inserting the connection pins (32) in the corner holes of the container (6) front side;
g) The hydraulic jacks (44) of the lifting system (39) are operated suspending the container (6) by the connection pins (32) of the front side connectors (29) and rear side connector (34);
h) The withdrawable loader (27) goes back bringing the container (6) from the sliding receptor (47) over the multidirectional sliding platform (26);
i) By closing the hydraulic jacks (44) of the lifting system (39) the container (6) is lowered inserting the spikes (37) of the multidirectional sliding platform (26);
j) The multidirectional sliding platform (26) is moved backwards so that the male docking pins (38) are released from female docking plate (49) the sliding receptor (47).

Buffers

One new equipment that is brought by this method is the container buffer (25) that can be installed at any port or logistic terminal and consists on a platform with the length of standard container wagons and with same height of the wagons where containers may dropped by the mobile (46.2) supporting structures equipped with the withdrawable loader (27) for a short stay and picked up again later, when they have to be shipped by train or by ship or transferred to another section of the port.

These buffers (25) may be used to pre-organize train loading and they may be as long as the regular trains and they can hold the containers for 1, 2 or 3 trains.

The operation of loading/unloading the buffers (25) with AGV-SSL can be done one by one, but the loading of the trains can be done simultaneously by several AGV-SSL aligned parallel to the train track.

One of the big advantages of the buffers (25) with this SSL system is that the preparation of train loads can be done container by container during day shift and can later be done automatically train by train at night shift.

The invention claimed is:

1. Equipment for sharing railway cars lower chassis with upper chassis or cabins for moving a container comprising:
   a self-transformable carriage composed by a lower chassis and a mobile upper chassis or cabins wherein the mobile upper chassis is equipped with the means to be self-contained and carrying cabins combined for different needs;
   a multidirectional sliding platform over a supporting structure wherein vertical stabilization jacks are installed allowing vertical hydraulic jacks tridirectionally levelling relative to a sliding receptor;
   mobile piers composed by several mobile supporting structures above which the multidirectional sliding platform of a withdrawable loader are installed that auto-align themselves parallel to railway wagons, forming a self-adjustable docking pier for train wagons;
   handling means consisting of a lifting system that comprises a rigid frame structure that moves vertically in relation to a transfer system by means of hydraulic jacks for suspending front side connectors and rear side connectors in order to lift and support a load;
   lateral moving means consisting of the transfer system comprising an arm frame which as a sliding frame where the lifting system is mounted;
   wherein in the rotated position, the rotational part where two connection pins are placed stays parallel to the container side wall and locked in this position enabling the two connection pins insertion in the container corners and lift the container with the lifting system.

2. Equipment according to claim 1, wherein both arms of the withdrawable upper chassis dedicated to the same container are blocked by a braced steel arm frame parallel to the sidewall of the containers to guarantee the synchronism of containers movement and proper side sliding of the containers.

3. Equipment according to claim 2, wherein braced arms of the withdrawable upper chassis slide over the multidirectional sliding platform which is connected to the supporting structure by multidirectional slider supports, for a fine multidirectional adjustment at the horizontal level of the withdrawable upper chassis relatively to the sliding receptor.

4. Equipment according to claim 3, wherein the sliding receptor has a female docking plate.

5. Equipment according to claim 4, wherein male docking pins are arranged in the multidirectional sliding platform for the correct coupling and support between the supporting structure and the sliding receptor.

6. Equipment according to claim 5, wherein the male docking pins laser guidance systems arranged for automatically docking the multidirectional sliding platform to the sliding receptor.

7. Method for using the equipment claimed in claim 6, characterized in that the method comprises the following steps:
   a) multidirectional slider supports move the multidirectional sliding platform in order to adjust the position of the withdrawable upper chassis arms with the sliding receptor;
   b) The multidirectional sliding platform travels in the transversal direction in a way the male docking pins of the multidirectional sliding platform are inserted in the female docking plates of the railway wagon;
   c) The withdrawable upper chassis arms goes to the sliding receptor leaving the transfer system and the lifting system parallel to the smaller sides of the containers;
   d) The rear side connector rotates 90° leaving the plate parallel to the side of the container;
   e) The withdrawable upper chassis goes back until the connection pins of the rear side connector are inserted in the corner holes of the container back side;
   f) The front connection jacks of the front side connector is activated in order to move the plate from the inclined position to the vertical position, inserting the connection pins in the corner holes of the container front side;

g) The hydraulic jacks of the lifting system are operated suspending the container by the connection pins of the front side connectors and the rear side connector;
h) The withdrawable upper chassis goes back bringing the container from the sliding receptor over the multidirectional sliding platform;
i) By closing the hydraulic jacks of the lifting system the container is lowered inserting the spikes of the multidirectional sliding platform;
j) The multidirectional sliding platform is moved backwards so that the male docking connectors are released from female docking plate of the sliding receptor, finishing the side sliding process.

\* \* \* \* \*